Jan. 5, 1926.  
C. F. FENLASON, JR.  
1,568,820  
APPARATUS FOR FORMING ANNULAR BLANKS FOR THE MANUFACTURE OF RUBBER TUBES  
Filed Oct. 20, 1924  
2 Sheets-Sheet 1
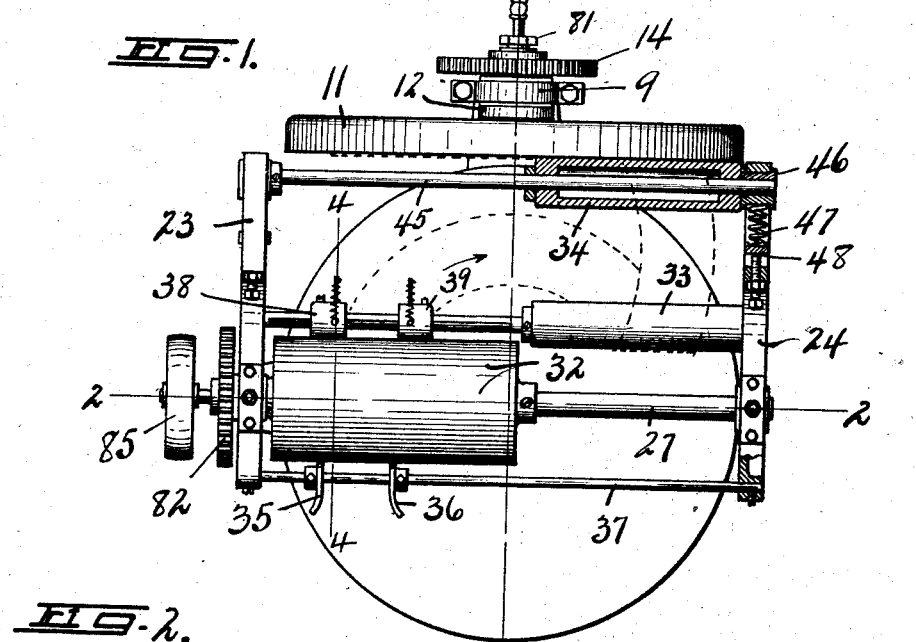
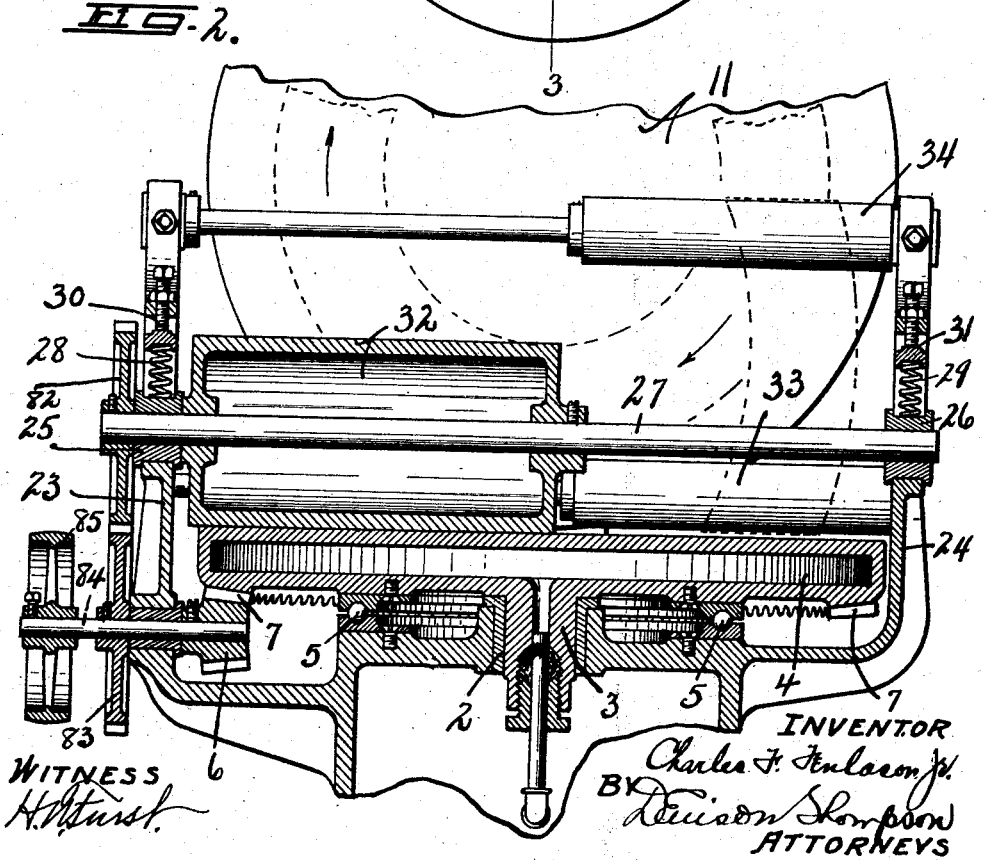

Jan. 5, 1926. 1,568,820
C. F. FENLASON, JR
APPARATUS FOR FORMING ANNULAR BLANKS FOR THE MANUFACTURE OF RUBBER TUBES
Filed Oct. 20, 1924 2 Sheets-Sheet 2
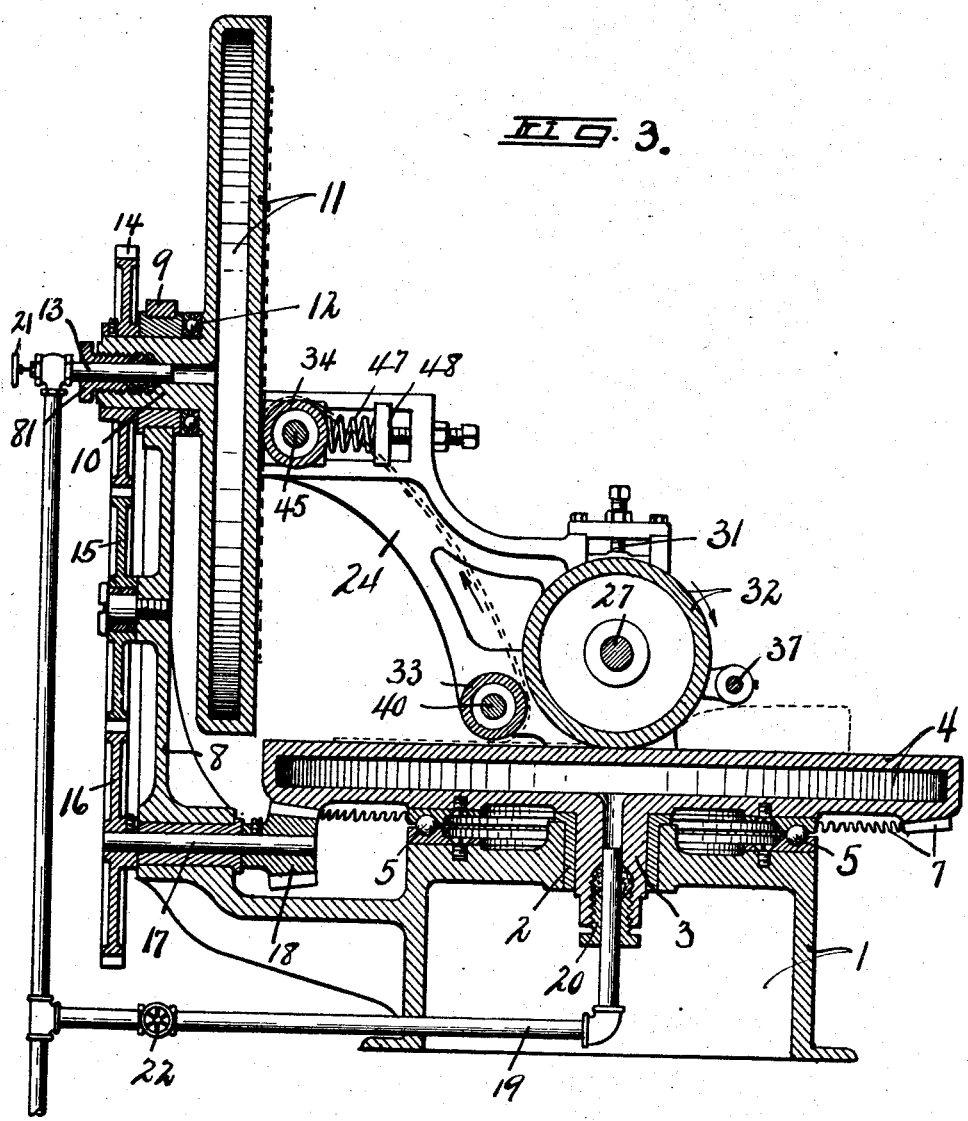
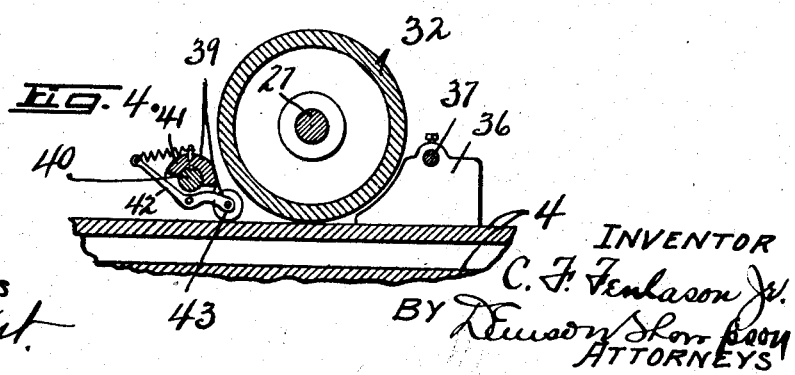

Patented Jan. 5, 1926.

1,568,820

UNITED STATES PATENT OFFICE.

CHARLES F. FENLASON, JR., OF MALONE, NEW YORK, ASSIGNOR OF ONE-FOURTH TO HARRY C. WILDER AND ONE-FOURTH TO LEWIS F. LEHR, BOTH OF MALONE, NEW YORK.

APPARATUS FOR FORMING ANNULAR BLANKS FOR THE MANUFACTURE OF RUBBER TUBES.

Application filed October 20, 1924. Serial No. 744,792.

*To all whom it may concern:*

Be it known that I, CHARLES F. FENLASON, Jr., a citizen of the United States of America, of Malone, in the county of Franklin, in the State of New York, have invented new and useful Improvements in Apparatus for Forming Annular Blanks for the Manufacture of Rubber Tubes, of which the following, taken in connection with the accompanying drawings, is a full, clear, and exact description.

This invention relates to certain new and improved apparatus for forming annular blanks for the manufacture of rubber tubes and the like.

The usual method employed for producing an annular blank of rubber of the desired number of plies and from two of which blanks a biscuit or tube is formed for subsequent vulcanization, has ordinarily included the rolling of crude rubber into the form of an elongated sheet of a width slightly greater than the diameter of the ring or washer to be produced therefrom.

From this strip the ring or washer is cut and a suitable number of such rings or washers are placed one upon the other in accordance with the number of plies required to produce a blank of the desired thickness. In view of the fact that the grain of the rubber sheet runs lengthwise of the sheet, a washer cut from such a sheet has an uneven or non-uniform shrinkage for the reason that the grain does not run uniformly lengthwise of the strip constituting the produced washer.

For this reason in order to maintain an approximate uniformity in the washer, a strip of fabric is rolled upon one side of the rubber sheet when the latter is being produced and this fabric remains upon the washer when the latter is cut from the strip and must be removed before the rubber washers are placed one upon another to form an annular blank of the proper thickness, for instance, from four to twelve-ply.

Further, there is a good deal of waste scrap produced by the usual process as described, and not only of rubber, but of the fabric to which the rubber is united.

The main object of this invention is the production of a machine, by means of which a more effective and desirable blank can be produced containing stock in better condition and stronger and of more even gauge, and to effect that result with economy of labor and material.

Other objects and advantages relate to the details of the structure of the machine, and to the parts thereof, all as will more fully appear from the following description, taken in connection with the accompanying drawings, in which:—

Figure 1 is a top plan view of a machine of my invention.

Figure 2 is a section on line 2—2, Figure 1.

Figure 3 is a section on line 3—3, Figure 1.

Figure 4 is a section on line 4—4, Figure 1.

The apparatus as shown comprises a main frame or supporting base —1— of any suitable form and shape, and provided with a journal —2— in which the cylindrical bearing —3— formed at the center of the heatable plate —4— is mounted. The plate —4— is as shown, preferably of substantially circular form, and includes an internal chamber for the reception of steam adaped to heat the plate. The plate —4— is further adapted to rotate around the bearing —3— mounted in the journal —2— and upon the ring of ball-bearings —5— arranged between the lower surface of the plate —4— and the frame —1—. The opposite ring retainers for the balls —5— may be mounted respectively upon the plate —4— and the base —1— so that the plate —4— is free to rotate with little friction when driven by the gear —6— meshing with the gear or gear-teeth —7— formed upon the outer portion of the lower surface of the hollow plate —4—.

In addition, the frame —1— includes a vertical bracket —8— at the rear of the machine and provided at its upper end with a journal —9— for receiving the hollow bearing —10— projecting from substantially the central portion of a second hollow plate —11—, the thrust of the plate —11— against the bearing —9— being taken by suitable ball-bearings —12— as indicated. The hollow plate —11— is preferably of substantially circular form and contains an internal chamber for the reception of steam as through pipe —13— secured in the hollow bearing —10— by packed joint —81—.

Gear —14— is provided for driving the plate —11— and for this purpose is mounted on and secured to the bearing —10— and is adapted to mesh with idler —15— which in turn meshes with gear —16— on shaft —17— carrying pinion —18— meshing with gear —7— upon the hollow-plate —4— so that as the hollow plate is driven by the pin —6— the plate will in turn drive the pin —18— and thereby transfer rotary movement to the hollow plate —11—.

Obviously other methods of effecting proper drive of the parts may be utilized in substitution for those here shown. The pipe —19— as indicated, is adapted to supply steam to the chamber in the hollow plate —4—, and as illustrated, extends into the hollow bearing —3— and is connected thereto by packed joint —20—. Valves may be provided where desired for independently controlling the flow of steam or cold water to the plates as the valve —21— controlling the flow of steam to the hollow plate —11— and valve —22— controlling the flow of steam to the hollow-plate —4— are each fed from a common source of supply.

The brackets —23— and —24— rising from opposite sides of the base —1— include guideways for the reception of the sliding journals —25— and —26— in which the shaft —27— is mounted, and these journals are normally held at their limit of movement in a downward direction by springs —28— and —29— placed under tension by the adjustable blocks —30— and —31—.

Upon the shaft —27— there is mounted a suitable calender or roller —32— of desired diameter, and of desired length, and this roller is adapted to cooperate with the heatable plate —4— in the production of a curved strip of rubber upon the surface of the plate —4—, which curved strip of rubber is carried over roll —33— and then over the roll —34— and downwardly around the roll —34— between the heated plate —11— and the roll whereby the curved strip is applied in ring or washer form to the face of the heated plate —11— and the operation is continued until a desired number of plies of the curved strip so formed have been applied to the face of the plate —11—.

The machine is further provided with adjustable spaced guides —35— and —36— at the front of the roll —32— and between which guides the crude rubber is adapted to be fed in producing the curved strip of rubber upon the plate —4—, and these guides may, as illustrated, be mounted upon rod —37— carried at the front of the frame —1—, the guides being slidable upon the rod to and from each other, and adapted to be held in any desired fixed relation by set screws, as illustrated.

At the rear of the roll there is provided a pair of spaced knives —38— and —39— slidably mounted upon shaft —40— which carries the roll —33— and these knives may be held in any desired relative spaced position upon the shaft —40— in any suitable manner, as by set screws.

These knives may be of any suitable form and construction for cutting off the opposite respective edges of the curved strip as formed upon the plate —4— so as to reduce that strip to the desired width and produce a strip having even and sharply defined edges.

As here illustrated, the knife includes a bearing —41— and a lever —42— pivoted to the bearing and carrying a rotary knife or blade —43— normally spring-tensioned toward the plate —4— by means of spring —44— connected to one end of the lever into the bearing —41— as illustrated.

The shaft —45— that carries the roll —34— may, as shown, be journaled in similar blocks —46— slidable in guide-ways formed in brackets —23— and —24— respectively, said blocks normally pressed toward the plate —11— by springs —47— backed up by adjustable screw members —48—. The roll —34— is here shown as not lying in a radius of the circular plate —11—, but its exact disposition may be varied so long as it is disposed in such a position that it will apply the curved rubber strip in ring form to the plate —11— and in length is approximately equal to the radius of the plate, but it will be obvious that the roll may be of any desired length for applying a strip of desired width to produce a blank of the proper size.

The roll or calender —32—, as shown, is radially disposed with respect to the heatable plate —4— and may be of any desired length and the plates —4— and —11— are preferably, as shown, of circular form and of a diameter sufficient to permit the production of a curved strip of the radius desired for producing a washer of desired diameter, and the roll may be driven in any suitable manner, as by gear —82— mounted on shaft —27— and meshing with gear —83— on shaft —84— that drives pinion —6—, pulley —85— being provided for that purpose.

In the structure here illustrated, there is shown a cylindrical roll —32— for rolling a curved strip upon the heatable plate —4—. However, this roll need not be of the shape shown, but may be of tapered or conical form with its smaller end toward the center of the plate —4— or the roll may be concave or convex, as desired. The cylindrical roll, however, has this feature of advantage that its outer portion has a more rapid relative movement with respect to plate —4— than does its inner portion whereby a mixing action of the crude or compounded rubber is effected, and an improved washer produced.

Preferably in feeding crude rubber between the heatable plate —4— and the calender —32— a section of the desired length is cut off from a cylindrical roll of sheet rubber and the piece so cut off from the cylindrical roll is fed endwise of the cylindrical section between the plate —4— and the calender —32—. This method has the advantage that whereas the grain of the original sheet ran lengthwise of the sheet by rolling in the opposite direction, i. e., endwise of the cylindrical section, a grain is produced perpendicular to the original grain of the sheet and extending lengthwise of the curved strip as formed upon the plate —4— whereby the stock in the curved strip is in an improved and stronger condition.

The operation of this machine in a general way is as follows:—

The crude or compounded rubber is fed in between the guides —35— and —36— and is rolled and perhaps mixed between the heated plate —4— and the calender —32— to form a curved strip of approximately the desired width and of the desired thickness. As the strip emerges from the roll —32— by reason of the rotation of plate —4— it is cut to the exact width by means of the knives —38— and —39—. The strip indicated in dotted lines on the plate —4— in Figure 1 is carried around to the roll —33— and moves upwardly around the roll and downwardly between roll —34— and plate —11— and is rolled in ring form upon the surface of the plate —11— in one or more plies, dependent upon the required thickness of the annular blank to be produced.

Altho I have shown and described a specific construction of machine as constituting an embodiment of my invention, I do not desire to restrict myself to the details of the structure or the method of operation thereof, as various changes may be made without departing from the invention as set forth in the appended claims.

I claim:

1. An apparatus of the character described comprising means for rolling a curved strip upon a plate, means for picking up the curved strip from the plate, and means for rolling the same upon a second plate to form an annular blank of desired thickness.

2. An apparatus of the character described comprising means for rolling crude or compounded rubber in the form of a curved strip and additional means for rolling the curved strip in ring form to produce an annular blank of desired thickness.

3. An apparatus of the character described comprising a heatable plate, means for rotating the plate, a calender for cooperation with the heatable plate, and a second heatable plate for receiving a curved strip of rubber rolled upon the first plate.

4. An apparatus of the character described comprising means for rolling crude or compounded rubber in the form of a curved strip and additional means for forming a curved strip into an annular blank of the desired number of plies.

5. An apparatus of the character described comprising a heatable plate, means for rotating the plate, a roll at one side of the center of the plate and adopted to cooperate with the plate in the production of a curved strip of rubber, a second heatable plate, means for rotating the plate and means for applying the curved strip of rubber formed on the first plate to the surface of the second plate in the form of an annular blank of the desired number of plies.

6. An apparatus of the character described comprising a heatable plate, means for rotating the plate, a roll at one side of the center of the plate and adapted to cooperate with the plate in the production of a curved strip of rubber, knives for shaping the opposite edges of the rubber strip, a second heatable plate, means for rotating the plate, and means for applying the curved strip of rubber formed on the first plate to the surface of the second plate in the form of an annular blank of the desired number of plies.

7. In an apparatus of the class described two rotary heatable plates having their axes of rotation disposed at substantially right angles.

8. In an apparatus of the class described, two rotary hollow plates, one of the same rotatable about a vertical axis and the other rotatable about a horizontal axis and means for rotating the plates.

9. In an apparatus of the class described, two rotary heatable plates, a calender for cooperating with one of said plates for producing a curved strip of rubber of desired thickness, and means for applying the formed curved strip to the other plate in the form of an annular blank of the desired number of plies.

10. In an apparatus of the class described, a plate, means for heating the plate, means for rotating the plate, a calender cooperating with the plate for producing a curved rubber strip of the desired thickness, means for shaping the opposite edges of the strip, a roll disposed adjacent the surface of the plate, a second plate, means for heating the second plate, a roll disposed adjacent the second plate and adapted to receive the strip from the first-named roll and apply it to the second plate in the form of an annular blank of the desired number of plies.

11. The method of calendering, which consists in calendering the stock in the form of a continuous helical strip and assembling the strip on a revolving support, the supporting surface of which is a plane.

12. In a calender, conical calendering rolls, a revoluble support to receive the calendered material, a pressure roll acting on the calendered stock on said support, actuating means for said rolls, and actuating means for said support.

In witness whereof I have hereunto set my hand this 19th day of September, 1924.

CHARLES F. FENLASON, Jr.